United States Patent
Park

(10) Patent No.: US 7,684,293 B2
(45) Date of Patent: Mar. 23, 2010

(54) WRITE ONCE OPTICAL DISC, AND METHOD AND APPARATUS FOR RECOVERING DISC MANAGEMENT INFORMATION FROM THE WRITE ONCE OPTICAL DISC

(75) Inventor: Yong Cheol Park, Gwachon-si (KR)

(73) Assignee: LG Electronics Inc., Seoul (KR)

(*) Notice: Subject to any disclaimer, the term of this patent is extended or adjusted under 35 U.S.C. 154(b) by 1290 days.

(21) Appl. No.: 10/841,516

(22) Filed: May 10, 2004

(65) Prior Publication Data

US 2005/0025003 A1 Feb. 3, 2005

Related U.S. Application Data

(60) Provisional application No. 60/469,005, filed on May 9, 2003.

(30) Foreign Application Priority Data

May 27, 2003 (KR) .................. 10-2003-0033696

(51) Int. Cl.
*G11B 7/00* (2006.01)
(52) U.S. Cl. ............... 369/47.14; 369/53.17
(58) Field of Classification Search ........... 369/47.1, 369/47.14, 53.13–53.17
See application file for complete search history.

(56) References Cited

U.S. PATENT DOCUMENTS 4,558,446 A * 12/1985 Banba et al. ............ 714/710
4,733,386 A  3/1988  Shimoi et al.
4,807,205 A  2/1989  Picard et al.
4,963,866 A  10/1990 Duncan
5,051,849 A  9/1991  Fukushima et al.
5,065,388 A  11/1991 Roth et al.
5,068,842 A  11/1991 Naito et al.
5,111,444 A  5/1992  Fukushima et al.
5,210,734 A  5/1993  Sakurai et al.
5,235,585 A  8/1993  Bish et al.
5,237,553 A  8/1993  Fukushima et al.

(Continued)

FOREIGN PATENT DOCUMENTS

CN  1134017 A  10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner*—William J Klimowicz
*Assistant Examiner*—Nathan Danielsen
(74) *Attorney, Agent, or Firm*—Birch, Stewart, Kolasch & Birch, LLP

(57) ABSTRACT

A write once optical recording medium and a method and apparatus for storing and recovering defect management information to and from the write once optical recording medium are provided. The recording medium includes at least one recording layer, and a data area on the recording layer. The data area includes at least one spare area and a user data area. The spare area contains at least one replacement cluster, each of the replacement clusters storing therein address information of a corresponding defective cluster.

31 Claims, 9 Drawing Sheets

U.S. PATENT DOCUMENTS

| | | |
|---|---|---|
| 5,247,494 A | 9/1993 | Ohno et al. |
| 5,289,450 A | 2/1994 | Mizumoto et al. |
| 5,319,626 A * | 6/1994 | Ozaki et al. ............. 369/47.14 |
| 5,343,456 A | 8/1994 | Maeda |
| 5,404,357 A * | 4/1995 | Ito et al. .................. 714/719 |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,526,335 A | 6/1996 | Tamegai |
| 5,528,571 A | 6/1996 | Funahashi et al. |
| 5,553,045 A | 9/1996 | Obata et al. |
| 5,557,537 A | 9/1996 | Normann et al. |
| 5,577,194 A | 11/1996 | Wells et al. |
| 5,608,715 A | 3/1997 | Yokogawa et al. |
| 5,633,764 A | 5/1997 | Ohta |
| 5,644,539 A | 7/1997 | Yamagami et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,825,726 A | 10/1998 | Hwang et al. |
| 5,848,038 A | 12/1998 | Igarashi et al. |
| 5,867,455 A | 2/1999 | Miyamoto et al. |
| 5,878,020 A | 3/1999 | Takahashi |
| 5,890,206 A | 3/1999 | Koike |
| 5,914,928 A | 6/1999 | Takahashi et al. |
| 5,930,815 A | 7/1999 | Estakhri et al. |
| 5,940,702 A | 8/1999 | Sakao et al. |
| 5,966,358 A | 10/1999 | Mine |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,182,240 B1 | 1/2001 | Mine |
| 6,189,118 B1 | 2/2001 | Sasaki et al. |
| 6,205,099 B1 | 3/2001 | Sasaki et al. |
| 6,212,647 B1 | 4/2001 | Sims, III et al. |
| 6,233,654 B1 | 5/2001 | Aoki et al. |
| 6,249,884 B1 | 6/2001 | Joo |
| 6,292,445 B1 | 9/2001 | Ito et al. |
| 6,301,220 B1 | 10/2001 | Takagi et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,393,513 B2 | 5/2002 | Estakhri et al. |
| 6,405,332 B1 | 6/2002 | Bando et al. |
| 6,414,923 B1 | 7/2002 | Park et al. |
| 6,418,100 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,493,302 B2 | 12/2002 | Takahashi |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 * | 5/2003 | Kim et al. .................. 714/723 |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,243 B2 | 12/2003 | Ando et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| RE38,638 E | 10/2004 | Yonemitsu et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,845,072 B1 | 1/2005 | Weirauch |
| 6,883,111 B2 | 4/2005 | Yoshida et al. |
| 6,918,003 B2 | 7/2005 | Sasaki et al. |
| 6,922,802 B2 | 7/2005 | Kim et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,317,670 B2 | 1/2008 | Park |
| 7,327,654 B2 | 2/2008 | Hwang et al. |
| 7,349,301 B2 | 3/2008 | Terada et al. |
| 7,355,934 B2 | 4/2008 | Park et al. |
| 7,372,788 B2 | 5/2008 | Park et al. |
| 7,372,792 B2 | 5/2008 | Park |
| 7,379,402 B2 | 5/2008 | Ko et al. |
| 7,428,670 B2 | 9/2008 | Hwang et al. |
| 7,483,349 B2 | 1/2009 | Park et al. |
| 7,483,355 B2 | 1/2009 | Park |
| 2001/0009537 A1 | 7/2001 | Park |
| 2001/0011267 A1 | 8/2001 | Kihara et al. |
| 2001/0014070 A1 | 8/2001 | Ando et al. |
| 2001/0021144 A1 | 9/2001 | Oshima et al. |
| 2001/0026511 A1 | 10/2001 | Ueda et al. |
| 2001/0033517 A1 | 10/2001 | Ando et al. |
| 2001/0043525 A1 | 11/2001 | Ito et al. |
| 2001/0043800 A1 | 11/2001 | Gotoh et al. |
| 2002/0025138 A1 | 2/2002 | Isobe et al. |
| 2002/0049938 A1 | 4/2002 | Ko |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2002/0186341 A1 | 12/2002 | Yamamura et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |

| | | | | | | |
|---|---|---|---|---|---|---|
| 2003/0135800 A1 | 7/2003 | Kim et al. | DE | 199 54 054 A1 | 6/2000 |
| 2003/0137909 A1 | 7/2003 | Ito et al. | EP | 0314186 A2 | 5/1989 |
| 2003/0137910 A1 | 7/2003 | Ueda et al. | EP | 0325823 A1 | 8/1989 |
| 2003/0137913 A1 | 7/2003 | Oshima et al. | EP | 0350920 A2 | 1/1990 |
| 2003/0142608 A1 | 7/2003 | Yamamoto et al. | EP | 0 428 208 A2 | 5/1991 |
| 2003/0149918 A1 | 8/2003 | Takaichi | EP | 0464811 A2 | 1/1992 |
| 2003/0173669 A1 | 9/2003 | Shau | EP | 0472484 A2 | 2/1992 |
| 2003/0198155 A1 | 10/2003 | Go et al. | EP | 0477503 A2 | 4/1992 |
| 2003/0237024 A1 | 12/2003 | Ogawa et al. | EP | 0556046 A1 | 8/1993 |
| 2004/0001408 A1 | 1/2004 | Propps et al. | EP | 0871172 A2 | 10/1998 |
| 2004/0004917 A1 | 1/2004 | Lee | EP | 0908882 A2 | 4/1999 |
| 2004/0022171 A1 | 2/2004 | Ko | EP | 0 971 345 | 1/2000 |
| 2004/0062159 A1 | 4/2004 | Park et al. | EP | 0974967 A1 | 1/2000 |
| 2004/0062160 A1 | 4/2004 | Park et al. | EP | 0989554 A1 | 3/2000 |
| 2004/0076096 A1 | 4/2004 | Hwang et al. | EP | 0 997 904 A1 | 5/2000 |
| 2004/0090888 A1 | 5/2004 | Park et al. | EP | 1026681 B1 | 8/2000 |
| 2004/0105363 A1 | 6/2004 | Ko et al. | EP | 1 040 937 A1 | 10/2000 |
| 2004/0114474 A1 | 6/2004 | Park et al. | EP | 1043723 A1 | 10/2000 |
| 2004/0120233 A1 | 6/2004 | Park et al. | EP | 1132914 A2 | 9/2001 |
| 2004/0125716 A1 | 7/2004 | Ko et al. | EP | 1 143 444 A2 | 10/2001 |
| 2004/0125717 A1 | 7/2004 | Ko et al. | EP | 1148493 A2 | 10/2001 |
| 2004/0136292 A1 | 7/2004 | Park et al. | EP | 1152414 A2 | 11/2001 |
| 2004/0145980 A1 | 7/2004 | Park et al. | EP | 1239478 A1 | 9/2002 |
| 2004/0158768 A1 | 8/2004 | Park et al. | EP | 1274081 A2 | 1/2003 |
| 2004/0160799 A1 | 8/2004 | Park et al. | EP | 1298659 A1 | 4/2003 |
| 2004/0165495 A1 | 8/2004 | Park et al. | EP | 1 321 940 A1 | 6/2003 |
| 2004/0174782 A1 | 9/2004 | Lee et al. | EP | 1329888 A1 | 7/2003 |
| 2004/0174785 A1 | 9/2004 | Ueda et al. | EP | 1347452 A2 | 9/2003 |
| 2004/0179445 A1 | 9/2004 | Park et al. | EP | 1 609 135 A0 | 9/2004 |
| 2004/0179458 A1 | 9/2004 | Hwang et al. | EP | 1547065 A0 | 6/2005 |
| 2004/0193946 A1 | 9/2004 | Park et al. | EP | 1547066 A1 | 6/2005 |
| 2004/0218488 A1* | 11/2004 | Hwang et al. ............ 369/44.32 | EP | 1552510 A1 | 7/2005 |
| 2004/0223427 A1 | 11/2004 | Kim et al. | EP | 1546740 A1 | 8/2005 |
| 2004/0246849 A1 | 12/2004 | Hwang et al. | EP | 1573723 A0 | 9/2005 |
| 2004/0246851 A1 | 12/2004 | Hwang et al. | EP | 1576603 A2 | 9/2005 |
| 2004/0246852 A1 | 12/2004 | Hwang et al. | EP | 1612790 A1 | 1/2006 |
| 2005/0007910 A1 | 1/2005 | Ito et al. | EP | 1623422 A0 | 2/2006 |
| 2005/0008346 A1 | 1/2005 | Noguchi et al. | GB | 2356735 A | 5/2001 |
| 2005/0025007 A1 | 2/2005 | Park | JP | 63-091842 A | 4/1988 |
| 2005/0047294 A1 | 3/2005 | Park | JP | 10-79940 A | 3/1989 |
| 2005/0050402 A1 | 3/2005 | Koda et al. | JP | 01-263955 A | 10/1989 |
| 2005/0052972 A1 | 3/2005 | Park | JP | 02-023417 A | 1/1990 |
| 2005/0052973 A1 | 3/2005 | Park | JP | 2-054327 A | 2/1990 |
| 2005/0055500 A1 | 3/2005 | Park | JP | 02-152072 A | 6/1990 |
| 2005/0060489 A1 | 3/2005 | Park | JP | 4-114371 A | 4/1992 |
| 2005/0068877 A1 | 3/2005 | Yeo | JP | 4-172662 A | 6/1992 |
| 2005/0083740 A1 | 4/2005 | Kobayashi | JP | 05-274814 A | 10/1993 |
| 2005/0083767 A1 | 4/2005 | Terada et al. | JP | 06-338139 A | 12/1994 |
| 2005/0083830 A1 | 4/2005 | Martens et al. | JP | 06-349201 A | 12/1994 |
| 2005/0111315 A1 | 5/2005 | Hwang et al. | JP | 729177 A | 1/1995 |
| 2005/0195163 A1 | 9/2005 | Ko et al. | JP | 7-121993 A | 5/1995 |
| 2005/0207262 A1 | 9/2005 | Terada et al. | JP | 8-50766 A | 2/1996 |
| 2005/0289389 A1 | 12/2005 | Yamagami et al. | JP | 08-096522 A | 4/1996 |
| 2006/0077827 A1 | 4/2006 | Takahashi | JP | 08-147702 A | 6/1996 |
| 2006/0195719 A1 | 8/2006 | Ueda et al. | JP | 08-273162 A | 10/1996 |
| 2006/0203635 A1 | 9/2006 | Ko et al. | JP | 09-145634 A | 6/1997 |
| 2006/0203638 A1 | 9/2006 | Ko et al. | JP | 09-231053 A | 9/1997 |
| 2006/0203684 A1 | 9/2006 | Ko et al. | JP | 09-270175 A | 10/1997 |
| 2006/0227694 A1 | 10/2006 | Woerlee et al. | JP | 09-282849 A | 10/1997 |
| 2006/0233078 A1 | 10/2006 | Terada et al. | JP | 9-320204 A | 12/1997 |
| 2007/0294571 A1 | 12/2007 | Park et al. | JP | 10-050005 A | 2/1998 |
| 2008/0046780 A1 | 2/2008 | Shibuya et al. | JP | 10-050032 A | 2/1998 |
| | | | JP | 10-187356 | 7/1998 |
| FOREIGN PATENT DOCUMENTS | | | JP | 10-187357 | 7/1998 |
| | | | JP | 10-187358 | 7/1998 |
| CN | 1140897 C | 1/1997 | JP | 10-187359 | 7/1998 |
| CN | 1227950 A | 9/1999 | JP | 10-187360 | 7/1998 |
| CN | 1246707 A | 3/2000 | JP | 10-187361 A1 | 7/1998 |
| CN | 1273419 A | 11/2000 | JP | 10-199154 A | 7/1998 |
| CN | 1342314 A | 3/2002 | JP | 10-261286 | 9/1998 |
| CN | 1479304 A | 3/2004 | JP | 11-39801 A | 2/1999 |
| CN | 1675708 A | 9/2005 | JP | 11-66751 | 3/1999 |
| CN | 1685426 A | 10/2005 | JP | 11-086418 A | 3/1999 |

| | | | | | | |
|---|---|---|---|---|---|---|
| JP | 11-86436 A | 3/1999 | TW | 302475 A | 4/1997 |
| JP | 11-110888 A | 4/1999 | TW | 371752 | 10/1999 |
| JP | 11-134809 A | 5/1999 | TW | 413805 | 12/2000 |
| JP | 11-203792 A | 7/1999 | TW | 495750 B | 7/2002 |
| JP | 2000-040308 A | 2/2000 | WO | WO-84/00628 A1 | 2/1984 |
| JP | 2000-090588 A | 3/2000 | WO | WO-96/30902 A1 | 10/1996 |
| JP | 2000-105980 | 4/2000 | WO | WO-97/22182 A1 | 6/1997 |
| JP | 2000-149449 A | 5/2000 | WO | WO-97/36296 A1 | 10/1997 |
| JP | 2000-195178 A | 7/2000 | WO | WO-00/07185 A1 | 2/2000 |
| JP | 2000-215612 | 8/2000 | WO | WO-00/54274 A1 | 9/2000 |
| JP | 2000-285607 A | 10/2000 | WO | WO-01/22416 A1 | 3/2001 |
| JP | 2000-285607 A | 10/2000 | WO | WO-01/24179 A1 | 4/2001 |
| JP | 2000-293948 | 10/2000 | WO | WO-01/35408 A1 | 5/2001 |
| JP | 2000-322835 | 11/2000 | WO | WO 01/75879 A1 | 10/2001 |
| JP | 2000-322875 A | 11/2000 | WO | WO-01/93035 A2 | 12/2001 |
| JP | 322875 A | 11/2000 | WO | WO-01/95330 A1 | 12/2001 |
| JP | 2000-339874 A | 12/2000 | WO | WO-02/086888 A2 | 10/2002 |
| JP | 2001-023317 A | 1/2001 | WO | WO-03/007296 A1 | 1/2003 |
| JP | 2001-069440 A | 3/2001 | WO | WO-03/025924 A1 | 3/2003 |
| JP | 2001-110168 A | 4/2001 | WO | WO-03/030173 A2 | 4/2003 |
| JP | 2001-148166 A | 5/2001 | WO | WO-03/063165 A1 | 7/2003 |
| JP | 2001-266464 | 9/2001 | WO | WO-03/079353 A1 | 9/2003 |
| JP | 2001-319339 | 11/2001 | WO | WO-2004/015707 A1 | 2/2004 |
| JP | 2001-351334 A | 12/2001 | WO | WO-2004/015708 A1 | 2/2004 |
| JP | 2001-357623 A | 12/2001 | WO | WO-2004025648 | 3/2004 |
| JP | 2002-015507 A | 1/2002 | WO | WO-2004025649 | 3/2004 |
| JP | 2002-015525 A | 1/2002 | WO | WO-2004/029668 A2 | 4/2004 |
| JP | 2002-50131 | 2/2002 | WO | WO-2004/029941 A1 | 4/2004 |
| JP | 2002-056619 A | 2/2002 | WO | WO-2004/029942 A1 | 4/2004 |
| JP | 2002-157832 A | 5/2002 | WO | WO-2004/029968 A2 | 4/2004 |
| JP | 2002-170342 A | 6/2002 | WO | WO-2004/033561 A1 | 4/2004 |
| JP | 2002-215612 A | 8/2002 | WO | WO-2004/034396 A1 | 4/2004 |
| JP | 2002-245723 A | 8/2002 | WO | WO-2004/053872 A1 | 6/2004 |
| JP | 2002-288938 A | 10/2002 | WO | WO-2004/053874 A1 | 6/2004 |
| JP | 2002-329321 A | 11/2002 | WO | WO-2004/059648 A2 | 7/2004 |
| JP | 2002-352522 A | 12/2002 | WO | WO-2004/068476 A1 | 8/2004 |
| JP | 2003-030844 A | 1/2003 | WO | WO-2004/075180 A1 | 9/2004 |
| JP | 2003505813 | 2/2003 | WO | WO-2004/077415 A1 | 9/2004 |
| JP | 2003-151216 A | 5/2003 | WO | WO-2004/079729 A1 | 9/2004 |
| JP | 2003-228962 A | 8/2003 | WO | WO-2004/079730 A1 | 9/2004 |
| JP | 2003-335062 A | 11/2003 | WO | WO-2004/079731 A1 | 9/2004 |
| JP | 2003-536194 A | 12/2003 | WO | WO-2004/079740 A1 | 9/2004 |
| JP | 2004-95057 A | 3/2004 | WO | WO-2004/081926 A1 | 9/2004 |
| JP | 2004-171714 A | 6/2004 | WO | WO-2004079631 | 9/2004 |
| JP | 2004-213774 A | 7/2004 | WO | WO-2004/086379 A1 | 10/2004 |
| JP | 2004-280864 A | 10/2004 | WO | WO-2004/093035 A1 | 10/2004 |
| JP | 2004-280865 A | 10/2004 | WO | WO-2004/093065 A1 | 10/2004 |
| JP | 2004-280866 A | 10/2004 | WO | WO-2004/100155 A1 | 11/2004 |
| JP | 2004-303381 A | 10/2004 | WO | WO-2004/100156 A1 | 11/2004 |
| JP | 2005-56542 A | 3/2005 | WO | WO-2005/004123 A1 | 1/2005 |
| JP | 2005-004912 A | 6/2005 | WO | WO-2005/004154 A2 | 1/2005 |
| JP | 2005-535993 A | 11/2005 | WO | WO-2005/024792 A2 | 3/2005 |
| JP | 2005-538490 A | 12/2005 | WO | WO-2005/062306 A1 | 7/2005 |
| JP | 2005-538491 A | 12/2005 | WO | WO-2005/073971 A2 | 8/2005 |
| JP | 2006503396 | 1/2006 | | | |
| JP | 2006-519445 A | 8/2006 | | | |
| KR | 1020040094301 A | 11/2004 | | | |
| RU | 2 174 716 C2 | 10/2001 | | | |
| RU | 2 192 673 C2 | 11/2002 | | | |
| RU | 2 223 556 C2 | 2/2004 | | | |
| RU | 2005 103 626 | 9/2005 | | | |
| RU | 2005 127 337 | 2/2006 | | | |
| TW | 283232 A | 8/1996 | | | |

OTHER PUBLICATIONS

Yokozeki, T. et al., "A Virtual Optical Disk Method to Realize Rewritability and Revision Control on a Write-Once Optical Disk", Systems and Computers in Japan, vol. 21, No. 8, 1990, pp. 34-43.

ECMA: "ECMA 238 Data interchange" XP-002289010; Jun. 1996; pp. 54-61.

* cited by examiner

* Defective cluster(D) is replaced with Replacement cluster(d)

ously that the present invention is not limited to any WRITE ONCE OPTICAL DISC, AND METHOD AND APPARATUS FOR RECOVERING DISC MANAGEMENT INFORMATION FROM THE WRITE ONCE OPTICAL DISC This application claims the priority benefit of U.S. Provisional Patent Application No. 60/469,005 filed on May 9, 2003, and Korean Patent Application No. 2003-033696 filed on May 15, 2003. The entire contents of each of the Provisional Application and the Korean Application is hereby incorporated by reference.

BACKGROUND OF THE INVENTION

1. Field of the Invention

The present invention relates to a write once optical disc and a method and apparatus for recovering disc management information from the write once optical disc.

2. Background of the Related Art

Optical discs are used widely as optical media for recording large sized data. Among the optical discs, recently a new high-definition digital video disc (HD-DVD) type of recording media, such as a Blu-ray disc, is under development. High definition video data and high definition audio data can be written and stored on such a Blu-ray disc for a long time. The Blu-ray disc, the next generation HD-DVD technology, can store much more data than the currently available DVDs.

Generally, the Blu-ray disc has a 1.2 mm thickness and a 12 cm diameter with a 0.1 mm thick optical transmission layer accessible with a bluish violet laser having a 405 nm wavelength, which is much finer than the currently available DVD that uses a red laser having a 650 nm wavelength.

Various draft standards for the Blu-ray disc are under preparation. In this regard, various draft standards for a Blu-ray disc write once (BD-WO) are under preparation in succession to a Blu-ray disc re-writable (BD-RE). A BD-WO is a write once Blu-ray optical disc that allows only one time recording on its area, whereas a BD-RE is a rewritable Blu-ray optical disc that allows recording, erasing and repeated recording of its area.

FIG. 1 illustrates a structure of a recording area of a BD-RE, schematically. The Blu-ray disc in FIG. 1 has one recording layer provided with, starting from an inner circumference of the disc, a lead-in area, a data area, a lead-out area. The data area has an inner spare area (ISA0) and an outer spare area (OSA0) respectively in the inner and outer circumferential parts of the data area, and a user area in the middle part of the data area for the user's data writing/recording.

If a defective area in the data area of the BD-RE is detected in the middle of data writing, a replacement writing operation is carried out in which the data in the defective area is transferred to the spare area. Then, as management information on the defective area, information on the positions and the like of the defective area and on the used replacement area is written in defect management areas (DMA1, DMA2, DMA3, and DMA4) of the lead-in/out areas, for management of defects.

However, since the writing on a particular area is possible only once in the write once optical disc, it is important to manage well position information indicating whether or not an area has a data written thereon, position information indicating the location of the disc area to which data can be written, defective area information indicating the location of defective areas, and the like. In the consolidated standards for write once optical discs such as BD-WOs under development, establishment of consolidated standards would be needed for methods of providing defect management information and recovering the defect management information in case the defect management information is damaged or has not yet been written. If data are written on a disc without recovering the lost disc management information, many problems would arise such as writing data based on incorrect prior management information and obtaining an incorrect position of the recordable area on the disc.

SUMMARY OF THE INVENTION

Accordingly, the present invention is directed to a write once optical recording medium, and a method and apparatus for storing and recovering disc management information to and from the optical disc that substantially obviate one or more of the problems due to limitations and disadvantages of the related art.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

According to an aspect of the present invention, there is provided a recording medium comprising at least one recording layer; and a data area on the at least one recording layer, the data area including at least one spare area and a user data area, the at least one spare area containing at least one replacement cluster, each of the at least one replacement cluster containing address information of a corresponding defective cluster.

According to another aspect of the present invention, there is provided a recording medium comprising at least one recording layer; and a data area on the at least one recording layer, the data area including at least one spare area and a user data area, the at least one spare area storing replacement data, the replacement data replacing defective data; wherein the replacement data further contain address information of corresponding defective data, and the replacement data and the defective data are stored by a predetermined unit.

According to another aspect of the present invention, there is provided a method of managing disc management information on a recording medium including a data area, the data area including at least one spare area and a user data area, the at least one spare area containing at least one replacement cluster, the method comprising (a) storing, in each of the at least one replacement cluster, address information of a corresponding defective cluster.

According to another aspect of the present invention, there is provided a method for recovering management information from a recording medium, the recording medium including a temporary defect management area for recording therein temporary disc definition structure (TDDS) information and temporary defect list (TDFL) information, the method comprising reproducing an (n−1)th TDDS information from the recording medium; determining if a certain area following an area indicated by the (n−1)th TDDS information has recording; determining position information associated with the certain area if the certain area has recording; and reconstructing an (n)th TDDS information based on the determined position information.

According to another aspect of the present invention, there is provided a method for recovering management information from a recording medium, the recording medium including a temporary defect management area for recording therein temporary disc definition structure (TDDS) information and temporary defect list (TDFL) information, the recording medium further including at least one spare area having at least one replacement cluster, each of the at least one replacement cluster having stored therein address information of a corresponding defective cluster and address information of the replacement cluster, the method comprising reproducing an (n−1)th TDFL information from the recording medium; reproducing the address information of the defective cluster and the address information of the replacement cluster from a certain replacement cluster; and reconstructing an (n)th TDFL information based on the reproduced address information.

According to another aspect of the present invention, there is provided an apparatus for managing disc management information on a recording medium including a data area, the data area including at least one spare area and a user data area, the at least one spare area including at least one replacement cluster, the apparatus comprising a recording/reproducing unit for recording and reproducing data to and from the recording medium; and a control unit for controlling the recording/reproducing unit to store, in each of the at least one replacement cluster, address information of a corresponding defective cluster.

According to another aspect of the present invention, there is provided an apparatus for recovering management information from a recording medium, the recording medium including a temporary defect management area for recording therein temporary disc definition structure (TDDS) information and temporary defect list (TDFL) information, the apparatus comprising a combination of elements for: reproducing an (n−1)th TDDS information from the recording medium; determining if a certain area following an area indicated by the (n−1)th TDDS information has recording; determining position information associated with the certain area if the certain area has recording; and reconstructing an (n)th TDDS information based on the determined position information.

According to another aspect of the present invention, there is provided an apparatus for recovering management information from a recording medium, the recording medium including a temporary defect management area for recording therein temporary disc definition structure (TDDS) information and temporary defect list (TDFL) information, the recording medium further including at least one spare area having at least one replacement cluster, each of the at least one replacement cluster having stored therein address information of a corresponding defective cluster and address information of the replacement cluster, the apparatus comprising a combination of elements for: reproducing an (n−1)th TDFL information from the recording medium; reproducing the address information of the defective cluster and the address information of the replacement cluster from a certain replacement cluster; and reconstructing an (n)th TDFL information based on the reproduced address information.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. For convenience of description, a case of a write once Blu-ray disc (BD-WO) will be described as an example.

Along with this, even though the inventor selects general terms used widely in describing the present invention as far as possible, the inventor selects the terms in particular cases at the inventor's discretion, when a meaning of the term is described in detail in a relevant description part of the present application. Therefore, the present invention should be understood by any meanings of the terms as defined by the inventor, if present.

<Definitions of Optical Disc and Disc Management Information>

Figure 1:
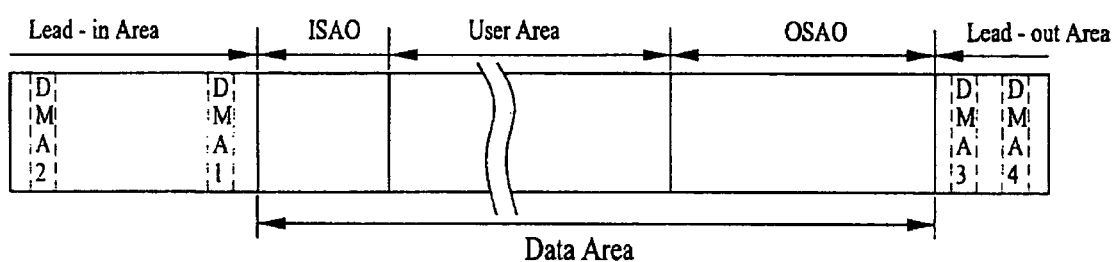
FIG. 1 illustrates a structure of a writing area on a BD-RE, schematically.
Figure 2:
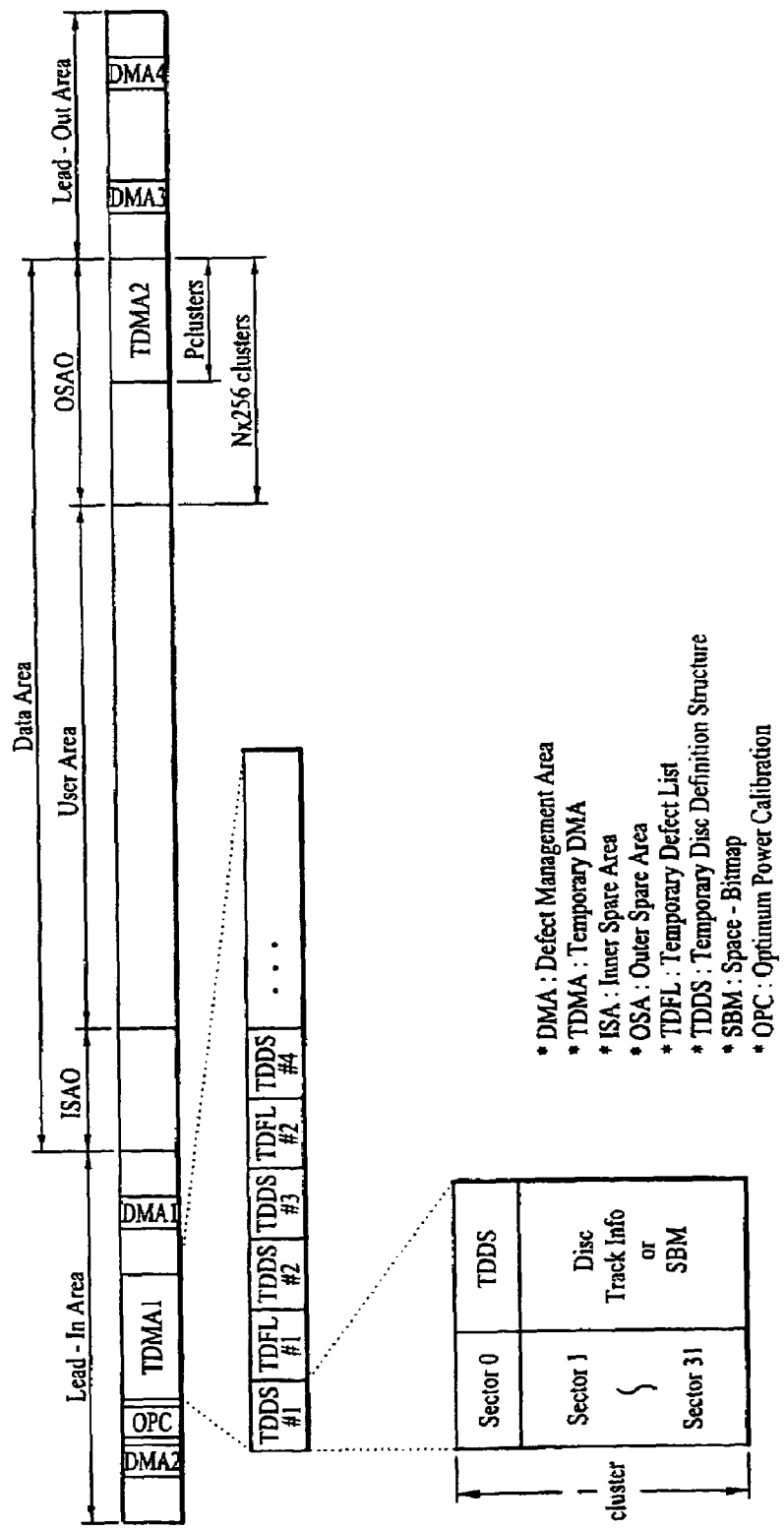
FIG. 2 illustrates a structure of a write once optical disc in accordance with the present invention.

FIG. 2 illustrates the structure of a write once optical disc such as a BD-WO in accordance with an embodiment of the present invention. The disc of FIG. 2 is a single layer disc having one recording layer, but the present invention is applicable to multi-layer write once optical disc such as a dual layer BD-WO.

Referring to FIG. 2, the recording layer of the disc includes a lead-in area, a data area, and a lead-out area. The data area includes inner and outer spare areas ISA0 and OSA0 for replacing defective areas for physical defect management. The lead-in area includes first and second DMAs (DMA1 and DMA2) whereas the lead-out area includes third and fourth DMAs (DMA3 and DMA4). Temporary Defect Management Areas (TDMAs) are also provided for temporarily storing and managing defective area information. When no more data is to be written on the write once optical disc or in response to a command from a host or system, data stored in the TDMA are transferred to a DMA for more permanent storage. Generally, in view of the importance of defect management, each of the DMAs carries the same management data for redundancy purposes.

In general, in the case of a rewritable optical disc, since writing/erasure can be repeated as many times as desired, a large sized DMA is not needed. However, this is not the case with a write once optical disc. In the case of a write once optical disc, once data are written to a recordable area, data cannot be written again to that area. As a result, a larger management area and/or an efficient management area structure and method are required for defect management.

As shown in FIG. 2, the TDMAs include a TDMA1 assigned to the lead-in area and having a fixed size, and a TDMA2 assigned to the outer spare area OSA0 and having a size varied in accordance with the size of the spare area. For instance, if the size of the OSA0 is N*256 clusters, then the size (P clusters) of the TDMA2 is as follows: P=(N*256)/4.

As disc management information, one or more Temporary Defect Lists (TDFLS) and one or more Temporary Disc Definition Structures (TDDSs) are written in each of the TDMA1 and TDMA2. Therefore, the disc management information according to the present invention means information written to the TDFLs and TDDSs, in a narrow sense.

Figure 3:
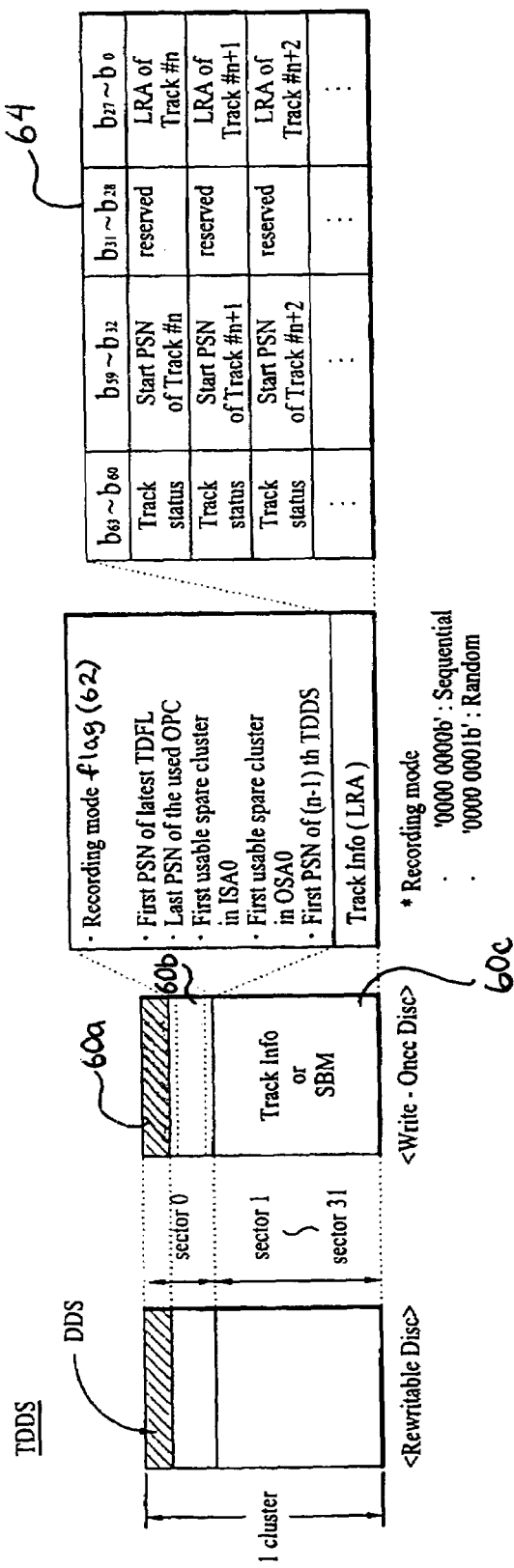
FIG. 3 illustrates temporary disc management information storable on the write once optical disc of FIG. 2 in accordance with the present invention.

If a defective area is found in the data area or a spare area, a process is carried out for transferring data from the defective area to a spare area. The TDFL is information for managing such a series of processes by using a defective area list, and is written out in 1-4 cluster size depending on the size of the defective area list (in case the disc is a single layer disc). The TDDS is written out in one cluster size and includes a Disc Definition Structure (DDS) information and disc use state information (track information or space bit map (SBM)) in a narrow sense as shown in FIG. 3.

In the present application, terms "TDDS" and "TDDS information" are used interchangeably, and terms "TDFL" and "TDFL information" are used interchangeably.

An Optimum Power Calibration Area (OPC Area) is assigned to the lead-in area for finding an optimum writing power, and has the structure and purpose, which are the same as the related art optical disc.

The contents of each TDDS will be described in more detail and in comparison to the structure of the related art re-writable optical disc by referring to FIG. 3.

As shown in FIG. 3, in the case of the re-writable optical disc, the DDS occupies approximately 60 bytes, a very small portion of one cluster (which has 32 sectors), and the rest of the one cluster is set in zero padding. However, in the present invention, in addition to the area (e.g., 60 bytes) 60a used as the DDS area in the related art re-writable optical disc, the rest 60b of the one sector is used as the DDS in the write once optical disc. Accordingly, the TDDS of the present invention is composed of the entire one sector (2048 bytes) used to store the DDS and the rest 60c of one cluster used to store disc use state information (track information or space bit map (SBM)).

As part of the DDS, information required for managing the write once optical disc according to the present invention includes the following information, but may include other information as needed in the process of standard establishment.

At first, for supporting a plurality of different writing methods, the DDS includes a recording mode flag 62 for indicating a particular recording mode/method. For instance, the recording mode flag 62 having a value of '0000 0000b' represents a sequential recording, and the recording mode flag 62 having a value of '0000 0001b' represents a random recording. The DDS further includes 'First PSN of latest TDFL,' 'Last PSN of the used OPC,' and 'First usable spare cluster in ISA0/OSA0' and 'First PSN of (n−1)th TDDS' for each of the spare areas. PSN means physical sector number.

Next, in the remaining thirty-one sectors (60c) of the one cluster of the TDDS, the disc use state information of the present invention is recorded. The disc use state information is information varied with the use of the disc, and particularly, in the case of the write once optical disc, such information is required for the accurate search of an additional recordable area obtained by sorting the entire disc area into written/unwritten areas. Although FIG. 3 discloses using the front first sector of one cluster as the DDS area and the rest of the 31 sectors of the one cluster as the area for storing the disc use state information, the present invention encompasses using the front 31 sectors of the one cluster as the area for storing the disc use state information, and the last $32^{nd}$ sector of the one cluster as the DDS area.

As mentioned above, the disc use state information can be, e.g., either the track information or SBM. If the recording mode flag 62 indicates a sequential recording, then the track information is stored in the area 60c as the disc use state information. But if the recording mode flag 62 indicates a random recording, the SBM is recorded in the area 10c as the disc use stage information.

The track information is one kind of information on the disc use state, and is applicable to the disc having the sequential recording applied thereto. In the related art write once optical discs such as a CD and a DVD, the use state information is known as track information for CDs, and RZone, Fragment, or recording range for DVDS. All these various terms will be called as 'track information' as a common name in the present invention, and should be understood as that meaning.

The SBM (Space Bitmap) is another kind of information indicating the disc use state, and is applicable to the disc having the random recording according to the present invention. The SBM is applicable to the entire area of the disc, wherein one bit is assigned to every smallest recording unit (e.g., one cluster in the case of a BD-WO), which is represented with '1b' if the cluster is a written area, and '0b' if the cluster is an unwritten area (or vice versa). Thus, upon reading the SBM information, the positions of the present written areas and unwritten areas of the write once optical disc can be known easily.

An example of the track information is indicated as 64 and is illustrated on the right side part of FIG. 3 schematically. The track information indicates a last recorded position of a data for each track in the disc, and the track information can include information on a Last Recorded Address (LRA) that indicates the address of the last recorded area in the user area.

The TDDS and TDFL as discussed above are needed to conduct defect management of the write once optical disc. However, situations arise when the recording of the TDDS and/or TDFL may fail, e.g., a power failure. For such situations, the present invention provides a disc structure and a method and apparatus for recovering disc management information such as a TDDS and/or TDFL. Such a disc structure will be discussed now.

Figure 4:
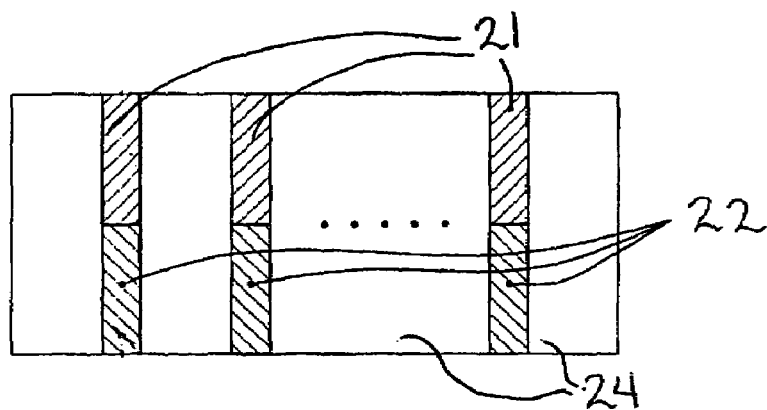
FIG. 4 illustrates a recording unit structure of a replacement area in a spare area of the write once optical disc of FIGS. 2 and 3 in accordance with the present invention.

FIG. 4 shows an example of a replacement cluster R in a spare area (e.g., ISA0 or OSA0 in FIG. 2) of a write once optical disc such as a BD-WO according to the present invention. As shown in FIG. 4, when a defect is found in the user area or a spare area of the write once optical disc, user data intended for or written in the cluster having this defect are written to an available area of the spare area. This available area is referred to herein as a replacement cluster d, and the cluster having the defect is referred to herein as a defective cluster D. A cluster is a unit of recording and includes one or more sectors as known.

The replacement cluster d includes an address area 21, a user control data area 22, and a replacement user data area 24. The address area 21 stores the address information of the replacement cluster d, e.g., the first PSN of the replacement cluster d. Other information may be stored in the address area 21. The address information of the defective cluster D, e.g., the first PSN of the defective cluster D, is stored in a certain area of the replacement cluster d, and this certain area can be, e.g., either the address area 21 or the user control data area 22. The user control data area 22 also stores therein control data for the replacement cluster d. The replacement user data area 24 stores the user data intended for or written to the defective cluster D.

Using the disc structure of FIG. 4, a method of recovering disc management information in accordance with a first embodiment of the present invention will be discussed referring to FIGS. 5-8. Lost disc/defect management information, i.e., information intended to recover, is indicated with the dashed lines in FIGS. 5 and 8.

Figure 5:
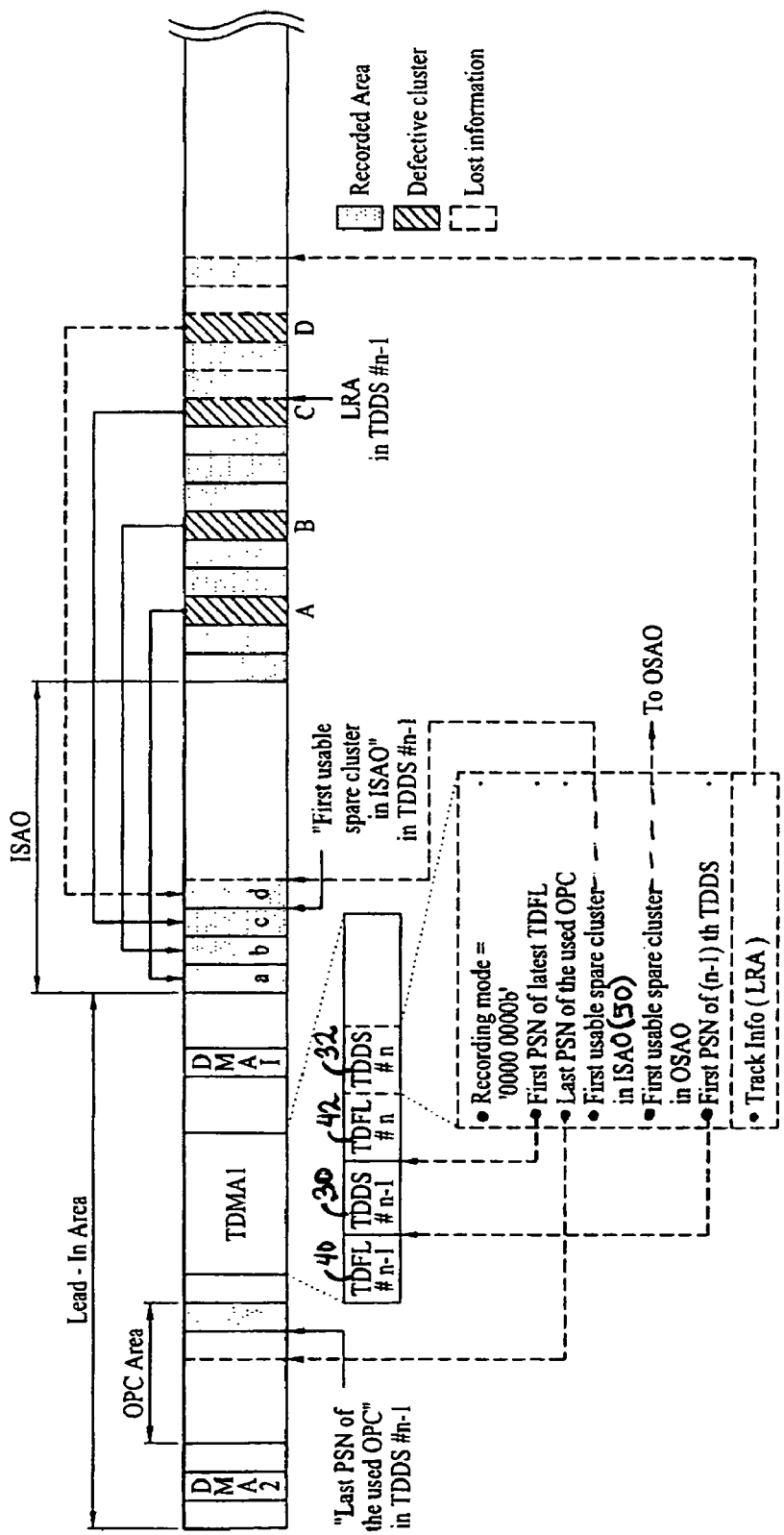
FIG. 5 illustrates the contents of temporary disc management information storable on the write once optical disc of FIGS. 2 and 3 in accordance with the present invention.

As shown in FIG. 5, the write once optical disc such as the disc of FIGS. 2 and 3 stores a plurality of TDFLs (#n−1, #n, . . . ) and a plurality of TDDSs (#n−1, #n, . . . ) in a TDMA such as a TDMA1. Each of the TDFLs and TDDSs has the structure as discussed in the present application. In this example, assume that an (n)th TDDS 32 is lost and that defects are present at A, B, C clusters in the data area and as a result, and user data are written respectively at 'a', 'b', and 'c' clusters in the spare area (ISA0) in place of the A, B, C clusters.

Figure 6:
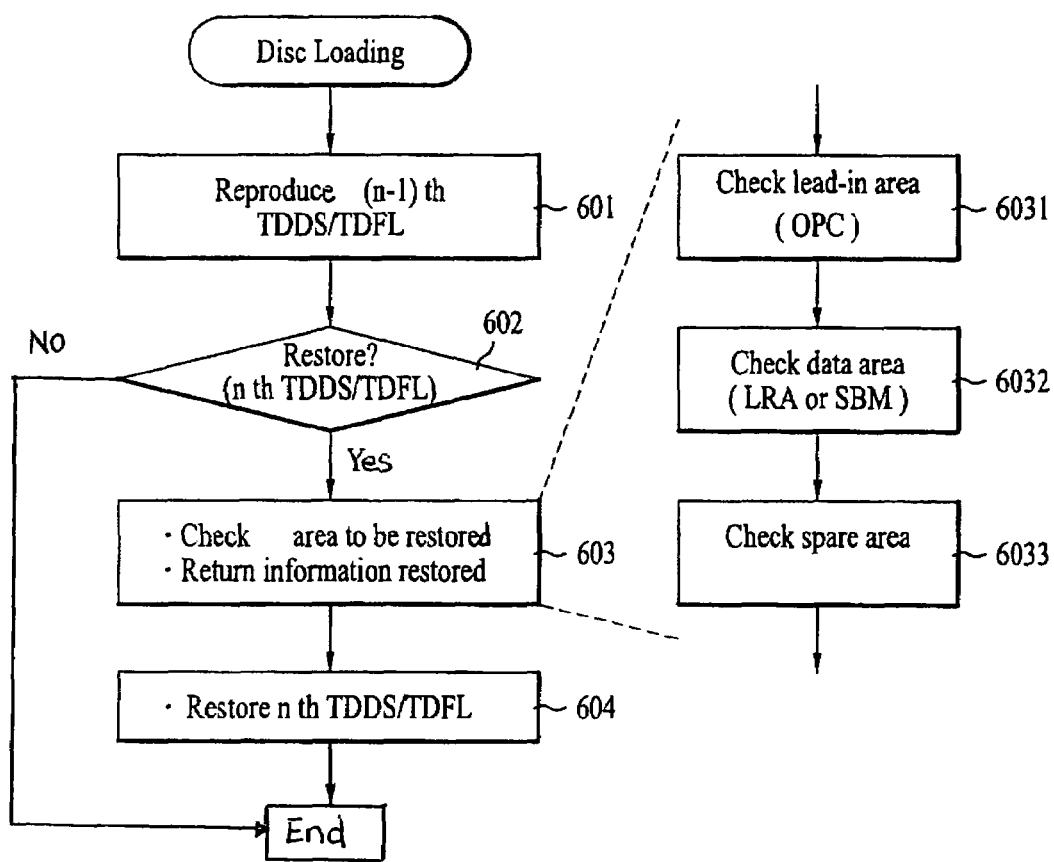
FIG. 6 illustrates a method of recovering disc management information of a write once optical disc in accordance with a first embodiment of the present invention.

To recover the lost (n)th TDDS 30, referring to FIG. 6, when the write once optical disc is loaded into a system including a recording/reproducing device (e.g., the system shown in FIG. 11 to be discussed later), the (n−1)th TDDS 30 (in FIG. 5) that is properly recorded on the BD-WO is read (step 601). Once the (n−1)th TDDS is obtained, positions of the last recorded areas of the disc at the time the (n−1)th TDDS is written can be known. For instance, from the (n−1)th TDDS, the last PSN of the used OPC in the lead-in area can be determined, the disc use state information [track information (LRA use) or SBM] for the data area can be obtained, and the first useable spare cluster in the spare area ISA0/OSA0 can be obtained.

If it is determined that the next TDDS ((n)th TDDS 32) needs to be recovered (step 602), then certain applicable areas of the disc are checked to obtain information needed to reconstruct the (n)th TDDS (step 603). More specifically, the area following each of the last recorded areas indicated by the (n−1)th TDDS is checked to see if there is any recording in that area. This checking can be implemented by using an RF signal test to be discussed later referring to FIG. 7. The location or address at which such recording in the area following each of the last recorded areas indicated by the (n−1)th TDDs ends, is then determined and used to reconstruct the (n)th TDDS (step 604). And the reconstructed (n)th TDDs is recorded as the (n)th TDDS 32 in the TDMA1 (step 604) and this completes the recovery of the lost (n)th TDDS according to the present invention. The step 602 can be progressed automatically or upon a request from a user or a host.

Figure 7:
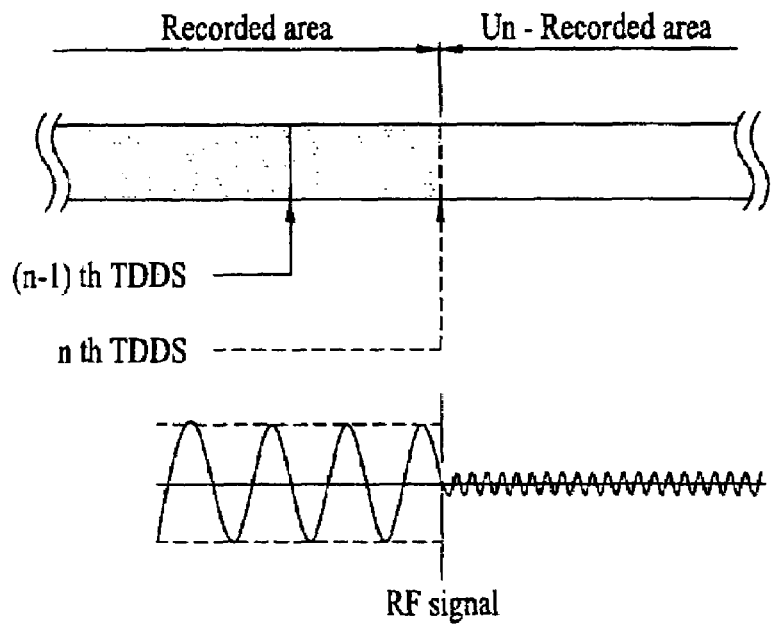
FIG. 7 illustrates a method of determining a recorded or unrecorded area on a write once optical disc in accordance with the present invention.

FIG. 7 illustrates the RF signal test that is used to determine whether an area of a disc is a recorded area or an unrecorded area according to the present invention. As shown in FIG. 7, the location of the recorded/unrecorded (written/unwritten) areas on the disc can be determined using an RF signal. Generally, an RF signal can be detected from a written/recorded area of the disc, whereas a little or no RF signal can be detected from an unwritten/unrecorded area of the disc. Therefore, by detecting the RF signal, the end address of the written area, which is what the (n)th TDDS intended to identify, can be detected.

The process as shown in FIG. 7 is carried out for each of certain areas of the disc to obtain the information needed to reconstruct the lost TDDS information (steps 6031, 6032, and 6033 in FIG. 6). For example, the last PSN of the used OPC can be determined by checking the RF signal from the lead-in area, the disc use state information [track information (LRA use) or SBM] can be obtained by checking the RF signal from the data area, and the first useable spare cluster can be obtained by checking the RF signal from the spare area ISA0/OSA0.

Next, a method of recovering an (n)th TDFL in accordance with the first embodiment of the present invention will be described with reference to FIGS. 5-8.

Figure 8:
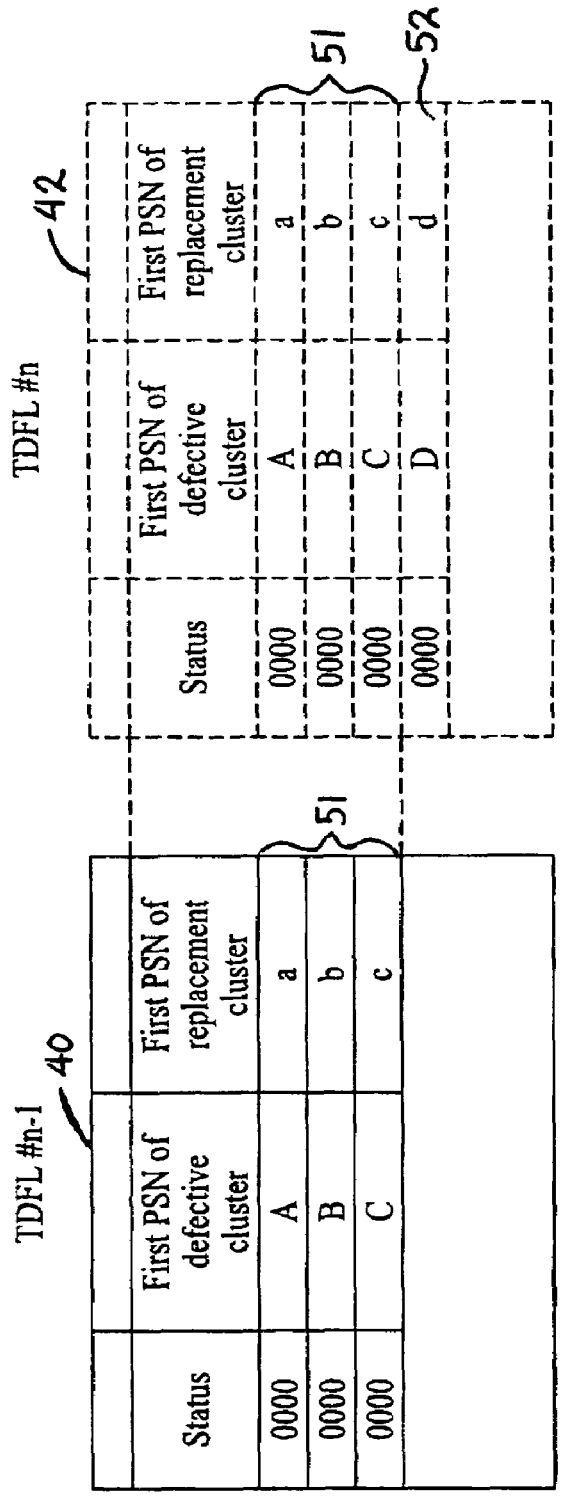
FIG. 8 illustrates the contents of lost temporary defective area information of the write once optical disc of FIGS. 2 and 3 in accordance with the present invention.

An example of the structure of the (n−1)th TDFL 40 in FIG. 5 is shown in FIG. 8. In the example of FIGS. 5 and 8, the (n−1)th TDFL 40 includes three entries 51 containing the first PSN of each of the defective clusters A, B, C and the first PSN of each of the replacement clusters a, b, c corresponding respectively to the defective clusters A, B, C. In other words, due to the defects in the clusters A, B, C in the data area, user data are written respectively to the clusters a, b, c in the spare area (ISA0) in place of the clusters A, B, C. Information on such defective and replacement clusters is then managed and stored as entries in the (n−1)th TDFL 40.

At a later recording time, assume that a defect is found at the cluster D in the data area. Then data intended for or written to the cluster D are written at the cluster d in the spare area (ISA0) in place of the cluster D. However, due to a failure in writing the (n)th TDFL to indicate this replacement writing, the system or host knows nothing about this replacement writing. As such, a method of recovering the (n)th TDFL is needed and is described as follows according to the present invention.

As shown in FIG. 6, when the disc is loaded in the system, reproducible properly recorded TDDS and TDFL are read (step 601), namely, the (n−1)th TDDS 30 and the (n−1)th TDFL 40 in FIG. 5. In the case of the above example, it is possible to obtain the three entries for the defective clusters A, B and C from the (n−1)th TDFL shown in FIG. 8, and a position information 50 of the first usable spare cluster (50) in the ISA0/OSA0 from the (n−1)th TDDS as shown in FIG. 5. The position information 50 of the first usable spare cluster as obtained from the (n−1)th TDDS, in this example, indicates the position or the starting address of the replacement cluster d.

Next, the existence of any recording in the area following the first usable spare cluster 50 indicated by the (n−1)th TDDS is determined (step 6033 in the step 603). That is, the system checks if there is any recording in the cluster d area. This checking is done by using the RF signal test discussed above in connection with FIG. 7. Depending on the system, the step 6033 can be progressed automatically or upon a request from a host or the like (step 602). In the case of the above example, it is determined that the cluster d has recording.

For the recovery of the (n)th TDFL, however, a full entry is required, which includes the position information of the defective cluster D corresponding to the replacement cluster d. But this position information is not obtainable merely by determining whether or not the replacement cluster d has recording therein using the RF signal test. Therefore, in order to obtain the position information of the defective cluster D, the present invention utilizes the position information of the defective D cluster recorded at a particular area of the reproducible replacement cluster d, as discussed above in connection with FIG. 4. For instance, the first PSN of the defective cluster D is recorded in either the address area 21 or the user control data area 22 of the replacement cluster d.

Therefore, in the above example, upon reading the user control data area (or the address area) of the replacement cluster d, the position information on the defective cluster D, a defective area, can be known. And this information is used to reconstruct the last full entry 52 of the (n)th TDFL as shown in FIG. 8. In this example, the last full entry 52 of the (n)th TDFL can be reconstructed with the first PSN of the replacement cluster d obtained from the step 6033 and the first PSN of the defective cluster D corresponding to the replacement cluster d, which was obtained from the user control data area (or the address area) of the replacement cluster d. Then the entire (n)th TDFL can be reconstructed with the three entries 51 from the (n−1)th TDFL and the recovered last entry 52.

Upon writing the (n)th TDFL recovered as discussed above in the TDMA area such as the TDMA1, the recovery process of the TDFL is completed (step 604).

The terms 'first PSN' and 'last PSN' will be described in more detail. One recording unit written on the disc (a cluster in the case of BD-WO) has a plurality of sectors, and the first PSN is the start address of the first sector, and the last PSN is the start address of the last sector. Therefore, if the direction of the use of the disc is in the direction of the PSN increase, the position of a particular recording unit can be known from the 'first PSN' of the cluster (i.e., the start address of the first sector of the cluster), and if the direction of the use of the disc is in the direction of the PSN decrease (like the OPC area), the position of a particular recording unit can be known from the 'last PSN' of the cluster (i.e., the start address of the last sector of the cluster). According to the present invention, 'position information' can mean the 'first PSN' and/or the 'last PSN,' but is not limited to such and can means other ways of indicating a particular location or position.

Figure 9:
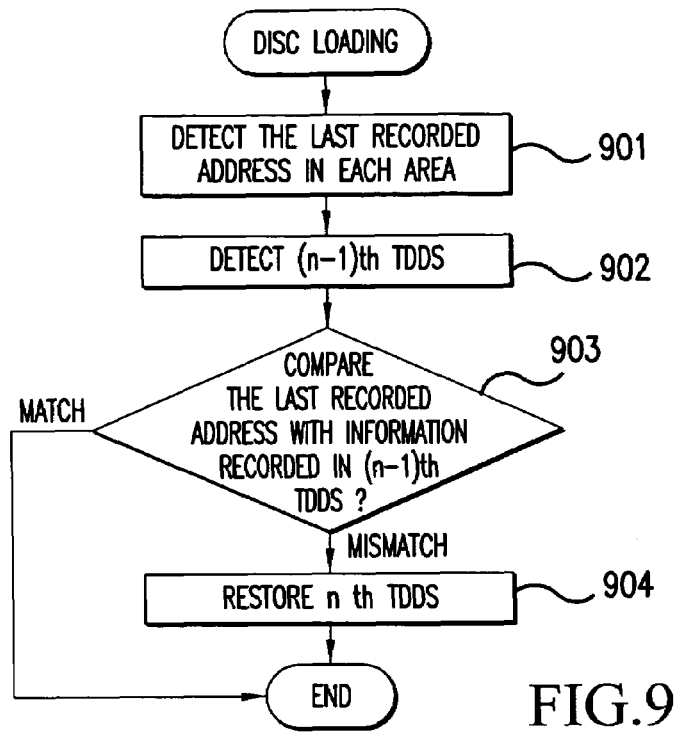
FIG. 9 illustrates a method of recovering temporary disc management information applicable to a write once optical disc in accordance with a second embodiment of the present invention.
Figure 10:
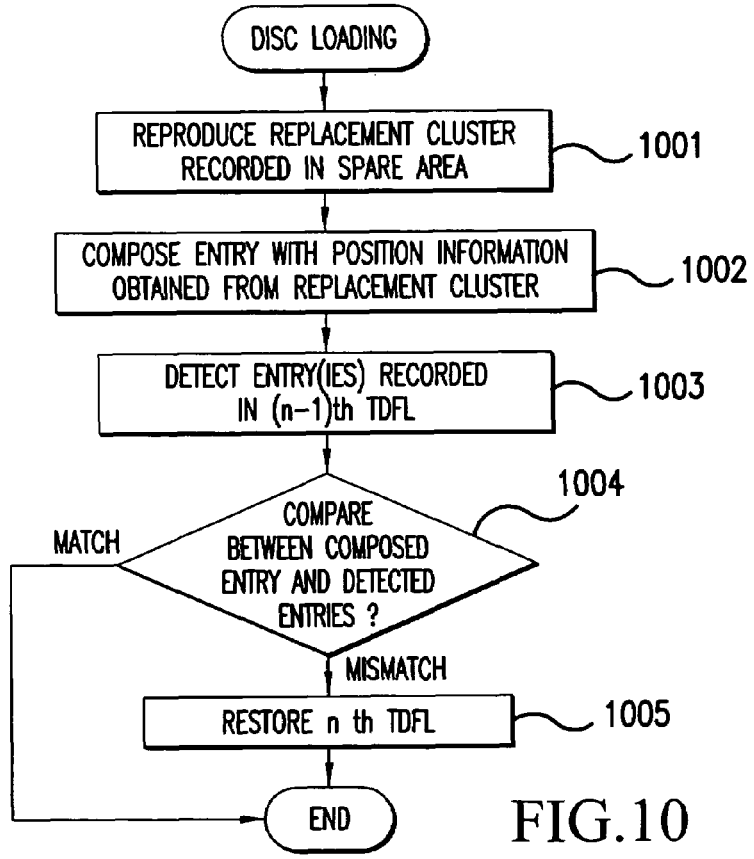
FIG. 10 illustrates a method of recovering temporary defective area information applicable to a write once optical disc in accordance with the second embodiment of the present invention.

Referring to FIGS. 9 and 10, a method of recovering disc management information in accordance with a second embodiment of the present invention, which suggests recovering lost disc management information (e.g., (n)th TDDS and (n)th TDFL) from an area recorded at the last time on the disc, will be now discussed. FIG. 9 illustrates the processing steps for recovering an (n)th TDDS and FIG. 10 illustrates the processing steps for recovering an (n)th TDFL.

To recover a lost (n)th TDDS, as shown in FIG. 9, when a write once optical disc such as the disc of FIGS. 2 and 3 is loaded in the system including the recording/reproducing device, last recorded positions of applicable areas (e.g., spare area, data area, lead-in area, etc.) on the disc are determined (step 901). This can be accomplished by using the RF signal test discussed above in connection with FIG. 7. Next, the (n−1)th TDDS is read from the TDMA (step 902). Then the position information obtained at the step 901 is compared to the position information obtained at the step 902 (step 903). If there is any discrepancy between the two pieces of position information, then the discrepancy information and the (n−1)th TDDS are used to reconstruct the lost (n)th TDDS (step 904), in the manner similar to the first embodiment discussed above. For instance, the discrepancy information should indicate the real last recorded locations of the disc (at the time of the (n)th TDDS) and this information is used to update or change the different pieces information stored in the (n−1)th TDDS, to compose the (n)th TDDs. But if there is no discrepancy detected at the step 903, then the system presumes there is no (n)th TDDS and the process ends.

Depending on the system, there may be a case in which the position information obtained from the last recorded areas on the disc is taken directly as the (n)th TDDS without the comparison step 903. Such a case may arise when there is no (n−1)th TDDS, or the reliability of data reproduced from the (n−1)th TDDS is questionable or low.

Therefore, in the method of recovering an (n)th TDDS in accordance with the second embodiment of the present invention, a finally recorded area on a disc is determined at first, and then the (n)th TDDS is recovered using the finally recorded area location information.

To recover an (n)th TDFL, as shown in FIG. 10, when the disc is loaded in the system, recorded areas in a spare area of the disc are reproduced (step 1001), from which position information on each of the replacement clusters and position information on each of the defective clusters corresponding to the replacement clusters are obtained (step 1002). This can be accomplished if the disc structure of FIG. 4 is used, which stores the position information of the replacement cluster and the position information of the corresponding defective cluster both within the replacement cluster. These two pieces of position information constitute the latest entry in the (n)th TDFL. Then any entry from the recorded (n−1)th TDFL is detected (step 1003). All the detected entries from the step 1003 are then compared with the composed entry from the step 1002. If there is any discrepancy, the discrepancy information and the entries from the (n−1)th TDFL are used to compose the (n)th TDFL (step 1005). That is, if there is a discrepancy, then the composed entry from the step 1002 is added cumulatively to the entries of the (n−1)th TDFL to reconstruct the (n)th TDFL. This process is used because generally the present TDFL should always contain information on all defective areas on the disc. If there is no discrepancy detected at the step 1004, then the system presumes there is no (n)th TDFL and the process ends.

Depending on the system, there may be a case in which the two pieces of position information from the replacement cluster are taken directly as the (n)th TDFL without the comparison step 1004. Such a case may arise when there is no (n−1)th TDFL, or the reliability of data reproduced from the (n−1)th TDFL is questionable or low.

Therefore, in the method of recovering an (n)th TDFL in accordance with the second embodiment of the present invention, position information is determined from the replacement area in the spare area at first, newest entry information is obtained from the position information, and the (n)th TDFL is reconstructed using the entry information.

Figure 11:
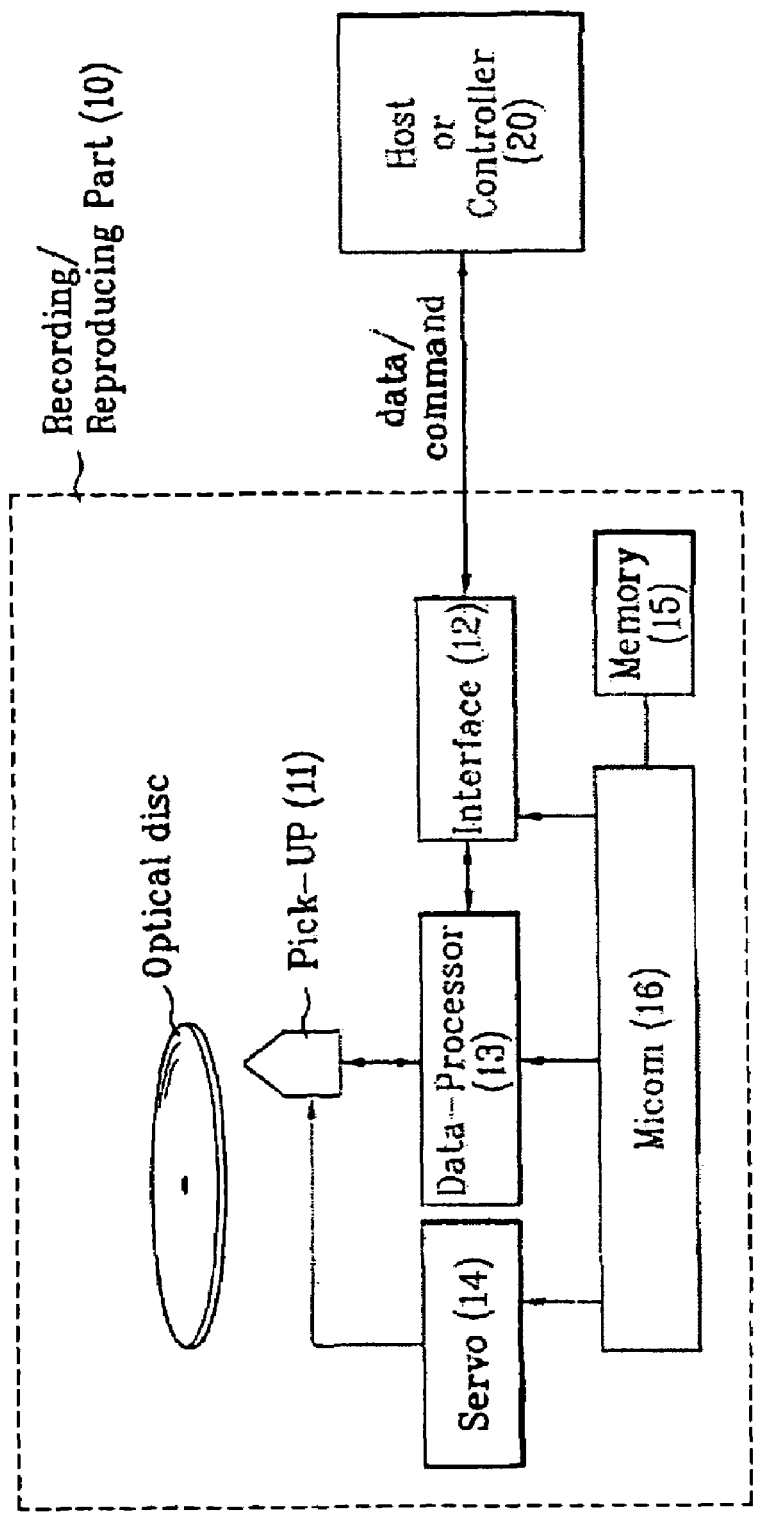
FIG. 11 illustrates an optical disc recording/reproducing apparatus according to the present invention.

FIG. 11 illustrates an optical disc recording/reproducing apparatus according to the present invention. This apparatus or other suitable apparatus or system can be used to implement the structure of the disc and the methods of storing and recovering the disc management information such as TDFL and TDDS as discussed above.

Referring to FIG. 11, the optical disc recording/reproducing apparatus includes a recording/reproducing unit 10 for recording and reproducing data to/from the optical disc and a controller 20 for controlling the recording/reproducing unit 10. All the elements of the recording/reproducing apparatus are operatively coupled. The controller 20 transmits a command for recording or reproducing to/from areas on the disc, to the recording/reproducing unit 10. The recording/reproducing unit 10 records or reproduces data to/from the disc according to the commands of the controller 20. The recording/reproducing unit 10 includes an interface unit 12, a pickup unit 11, a data processor 13, a servo unit 14, a memory 15 and a microcomputer 16. The interface unit 12 communicates with external devices such as the controller 20. The pick-up unit 11 records or reproduces data to/from the optical disc directly. The data processor 13 receives a reproduction signal from the pick-up unit 11, restores a preferred signal, modulates a signal proper to the optical disc, and transmits the signal. The servo unit 14 controls the pick-up unit 11 to read the signal from the optical disc or to record the signal to the optical disc. The memory 15 stores temporarily data and various information including disc management information as needed. The microcomputer 16 controls the components of the recording/reproducing unit 10 and can implement or control the processing steps of the methods of recovering the TDFL and TDDS according to the present invention.

According to the first and second embodiments of the present invention, the recovery of the (n)th TDDS and the (n)th TDFL can be progressed at the same time or separately at different times.

The recovery of lost disc management information (particularly TDDS and TDFL) from the information on the finally recorded area(s) on the disc and prior TDDS/TDFL information, prevents occurrence of an error caused by the loss of the management information, thereby allowing a more effective use of the disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recovering management information from a recording medium, the recording medium including a temporary defect management area for recording therein temporary disc definition structure (TDDS) information and temporary defect list (TDFL) information, the method comprising:
    reproducing TDDS information recorded in the recording medium;
    determining if a certain area following an area indicated by the reproduced TDDS information has recorded data;
    determining position information associated with the certain area if the certain area has recorded data; and
    reconstructing lost TDDS information based on the determined position information.

2. The method of claim 1, wherein the step of determining the position information is performed using an RF signal from the certain area.

3. The method of claim 2, wherein in the reconstructing step, the lost TDDS information includes at least one of the following:
    a recording mode flag,
    first address information of latest TDFL information,
    last address information of used optimum power calibration information,
    first address information of a usable spare cluster, and first address information of the lost TDDS information.

4. The method of claim 3, wherein in the reconstructing step, the lost TDDS information further includes disc use state information.

5. The method of claim 1, wherein in the reproducing step, the recording medium is a write once optical disc.

6. The method of claim 5, wherein in the reproducing step, the write once optical disc is a Blu-ray write once disc.

7. A method for recovering management information from a recording medium, the recording medium including a lead-in area and a data area having a spare area and a user data area, the spare area including one or more replacement clusters, and at least one of the lead-in area and the spare area including a temporary defect management area for storing therein temporary disc definition structure (TDDS) information and temporary defect list (TDFL) information, the method comprising:
    reproducing TDFL information in the temporary defect management area;
    reproducing, from a replacement cluster the address information of a defective cluster replaced by the replacement cluster and the address information of the replacement cluster; and
    reconstructing lost TDFL information based on the reproduced address information.

8. The method of claim 7, wherein in the step of reproducing the address information, the address information of the defective cluster is reproduced from a user control data area of the replacement cluster.

9. The method of claim 7, wherein in the step of reproducing the address information, the address information of the replacement cluster is reproduced from an address area of the certain replacement cluster.

10. The method of claim 7, wherein in the step of reproducing the address information, the address information of the defective cluster is reproduced from an address area of the replacement cluster.

11. The method of claim 7, wherein the address information of the defective cluster is a first physical sector number of the defective cluster.

12. The method of claim 7, wherein the recording medium is a write once optical disc.

13. The method of claim 12, wherein the write once optical disc is a Blu-ray write once disc.

14. The method of claim 7, wherein the step of reconstructing the lost TDFL information comprising:
    comparing the reproduced address information with related entry information contained in the reproduced TDFL information.

15. The method of claim 14, wherein the step of reconstructing the lost TDFL information comprising:
    if the reproduced address information is discrepant with the related entry information, adding entry information having the reproduced address information to the reproduced TDFL information.

16. The method of claim 7, wherein the step of reproducing the address information comprises reproducing address information of each defective cluster and address information of each replacement cluster from all the replacement clusters and the step of reconstructing the lost TDFL information comprises comparing the reproduced address information of the each defective cluster and the replacement cluster with related entry information contained in the reproduced TDFL information.

17. The method of claim 7, further comprising:
    reconstructing the lost TDFL information to include information on all defective areas existing on the data area.

18. An apparatus for recovering management information from a recording medium, the recording medium including a lead-in area and a data area having a spare area and a user data area, the spare area including one or more replacement clusters, and at least one of the lead-in area and the spare area including a temporary defect management area for storing therein temporary disc definition structure (TDDS) information and temporary defect list (TDFL) information the apparatus comprising:
    an optical pick-up configured to record/reproduce data onto/from the recording medium; and a microcomputer operatively coupled to the optical pick-up and configured to control the optical pick-up to reproduce TDFL information recorded in the temporary defect management area, control the optical pick-up to reproduce, from a replacement cluster, address information of a defective cluster and address information of the replacement cluster, and reconstruct lost TDFL information based on the reproduced address information.

19. The apparatus of claim 18, wherein the microcomputer is configured to reconstruct the lost TDFL information by comparing the reproduced address information with related entry information contained in the reproduced TDFL information.

20. The apparatus of claim 19, wherein the microcomputer is configured to reconstruct the lost TDFL information by adding entry information having the reproduced address information to the reproduced TDFL information if the reproduced address information is discrepant with the related entry information.

21. The apparatus of claim 18, wherein the address information of the defective cluster is reproduced from an address area of the replacement cluster.

22. The apparatus of claim 18, wherein the address information of the defective cluster is a physical sector number of the defective cluster.

23. The apparatus of claim 18, wherein the microcomputer is configured to control the optical pick-up to reproduce address information of each defective cluster and address information of each replacement cluster from all the replacement clusters and compare the reproduced address information of the each defective cluster and the replacement cluster with related entry information contained in the reproduced TDFL information.

24. The apparatus of claim 18, wherein the microcomputer is configured to reconstruct the lost TDFL information to include information on all defective areas existing on the data area.

25. A computer readable recording medium, comprising:
a lead-in area; and
a data area having a spare area and a user data area, wherein:

the spare area includes one or more replacement clusters, and at least one of the lead-in area and the spare area including a temporary defect management area, and the temporary defect management area stores therein temporary disc definition structure (TDDS) information and temporary defect list (TDFL) information, wherein the temporary defect management area includes:
TDFL information recorded therein, and
TDFL information reconstructed based on the recorded TDFL information and address information of a replacement cluster and a defective cluster replaced by the replacement cluster, the address information contained in the replacement cluster.

26. The computer readable recording medium of claim 25, wherein the reconstructed TDFL information is reconstructed by comparing the address information with related entry information contained in the recorded TDFL information.

27. The computer readable recording medium of claim 26, wherein the reconstructed TDFL information is reconstructed by adding entry information having the address information to the recorded TDFL information if the address information is discrepant with the related entry information contained in the recorded TDFL information.

28. The computer readable recording medium of claim 25, wherein the address information of the defective cluster is located in an address area of the replacement cluster.

29. The computer readable recording medium of claim 25, wherein the address information of the defective cluster is a physical sector number of the defective cluster.

30. The computer readable recording medium of claim 25, wherein the reconstructed TDFL is reconstructed by comparing all the replacement clusters address information of each defective cluster and address information of each replacement cluster contained in all the replacement clusters with related entry information contained in the reproduced TDFL information.

31. The computer readable recording medium of claim 25, wherein the reconstructed TDFL information includes information on all defective areas existing on the data area.

* * * * *